April 5, 1938.     A. G. DEAN     2,113,542
DRAFT GEAR
Original Filed Jan. 31, 1934     3 Sheets-Sheet 1
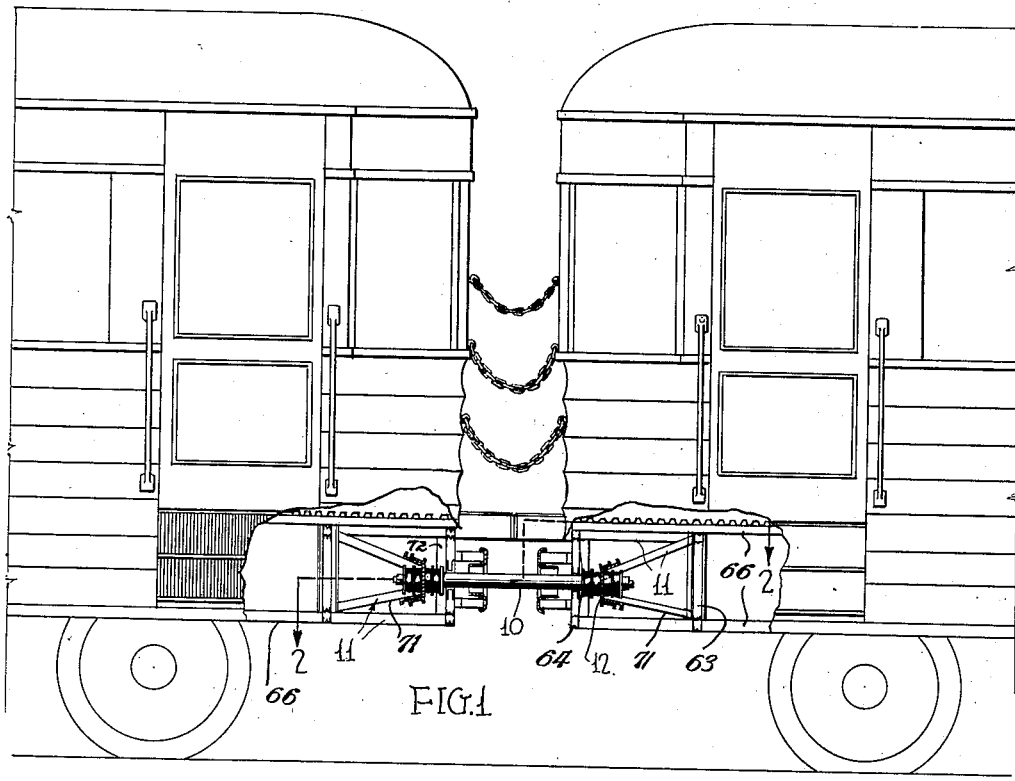
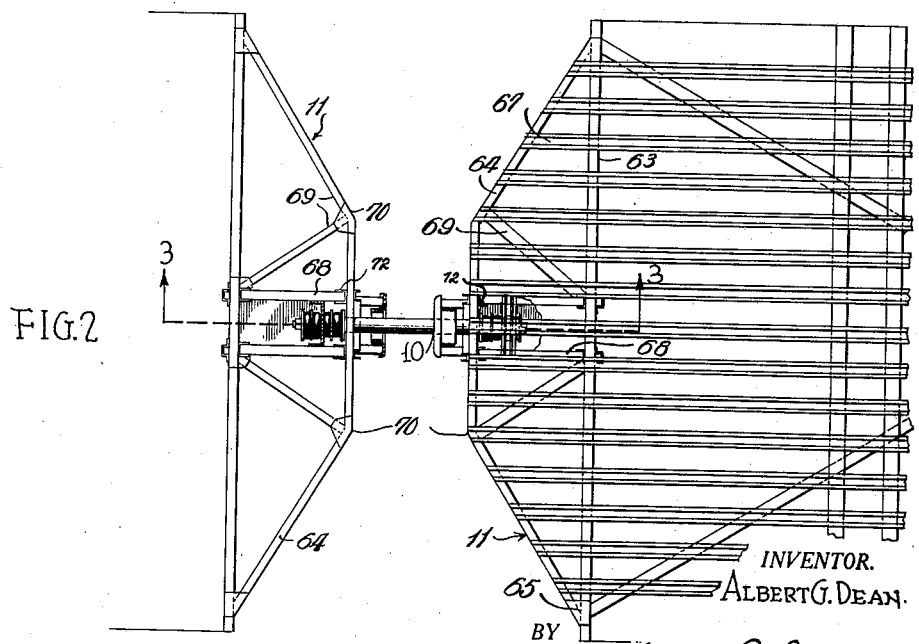
INVENTOR.
ALBERT G. DEAN.
BY
John P. Tarbox
ATTORNEY.

April 5, 1938.     A. G. DEAN     2,113,542
DRAFT GEAR
Original Filed Jan. 31, 1934     3 Sheets-Sheet 2

INVENTOR.
ALBERT G. DEAN.
BY John P. Tarbox
ATTORNEY.

April 5, 1938.   A. G. DEAN   2,113,542
DRAFT GEAR
Original Filed Jan. 31, 1934   3 Sheets-Sheet 3

INVENTOR.
ALBERT G. DEAN.
BY
John P. Tarbox
ATTORNEY.

Patented Apr. 5, 1938

2,113,542

UNITED STATES PATENT OFFICE 2,113,542

DRAFT GEAR

Albert G. Dean, Narberth, Pa., assignor to Edward G. Budd Manufacturing Co., Philadelphia, Pa., a corporation of Pennsylvania Application January 31, 1934, Serial No. 709,139
Renewed July 26, 1937

7 Claims. (Cl. 213—14)

The present invention relates in general to draft gear, and more particularly to shock absorbing draft gear for light rail cars or like vehicles.

The general object of the invention is the provision of a light shock absorbing draft gear for use on short trains of light rail cars or like vehicles and capable of transmitting compression and tractive forces directly to and through the car frame, thus doing away with the necessity for a center sill for distributing these forces, which latter element in the case of extremely light rail cars, would add very little to the strength of the car in proportion to the weight of such element.

Another object is to provide a practical arrangement for the utilization of rubber as a shock absorber whereby an improved rate of build up in tension is attained and the "spring bottoming" effect incident to the use of metallic coil springs is avoided, while retaining the strength and reliability of metallic springs.

Another object of the invention is to provide an arrangement whereby the shock absorption is attained with silence and without direct engagement of relatively movable metallic parts.

A further object is the provision of a shock absorbing draft gear capable of use with either a semi-permanent coupling such as a draft bar or the conventional automatic coupling.

The above objects of the invention are attained in general through the provision of a draft frame secured to the end structure of the car frame in a manner to distribute compression and tractive forces directly to the car frame and mainly to that portion which constitutes the floor framing, and securing to said draft frame the coupling member such as a draw bar or the shank of an automatic coupler, through the intermediation of rubber cushion members interposed in the connection in a manner to act as a shock absorber always in compression and so arranged as to maintain positive mechanical connection between the parts even in the event of deterioration of the rubber.

When the draft gear is used with an automatic coupler the coupler shank is substantially rigidly connected to a yoke member which in turn is connected to the draft frame for longitudinal sliding movement in relation thereto and for oscillatory movement about a vertical axis and is arranged to be resiliently held in a normal intermediate position against either of said movements by rubber cushion members interposed between the yoke and the draft frame under partial compression. The rubber cushion members are thus made to act both as shock absorbers and as a means for resiliently holding the coupling member in normal center position and thus in a position to permit automatic coupling when the two cars are brought together.

Silent operation is obtained by the interposition of rubber between all relatively removable metallic parts which is accomplished with simplicity of structure by the use of rubber cushion members which act as shock absorbers, and provide a flexible joint and insulation between relatively moving parts, whereby no relatively movable metallic parts are permitted to contact directly with each other, all relative movement between such parts out of normal position is resiliently restrained, and all lost motion taken up by expansion of the rubber cushion members which for this purpose are arranged to be normally under partial compression.

The above and other objects and advantages of the invention will be more clearly understood from a perusal of the following specification and the drawings accompanying the same.

In the drawings,

Fig. 1 is a fragmentary side elevation of a pair of rail cars coupled together, showing parts of the draft gear in vertical axial section.

Fig. 2 is a plan view taken along the line 2—2 of Figure 1, certain parts being broken away and certain parts being shown in section.

Figure 3:
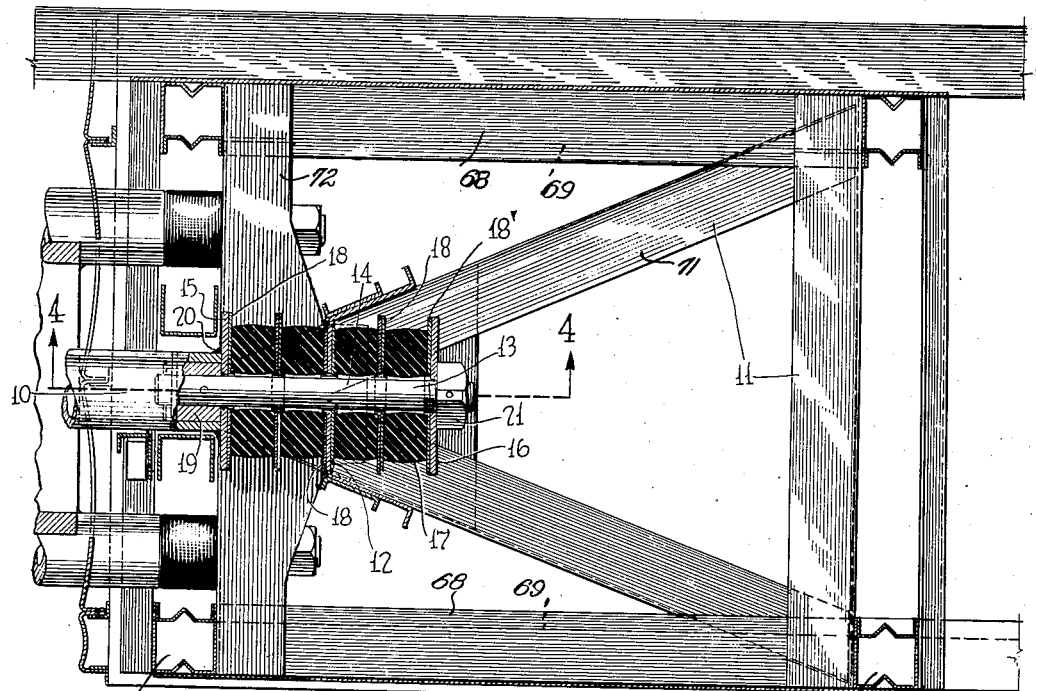
Fig. 3 is an enlarged view in vertical section taken on the line 3—3 of Fig. 2.
Figure 4:
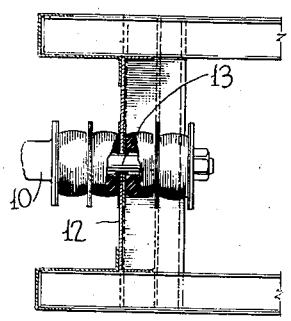
Fig. 4 is a fragmentary horizontal sectional view on the line 4—4 of Fig. 3 on a smaller scale than that of Fig. 3.

Referring to the drawings in detail, and first to Figs. 1 to 4, which show a simple form of the invention for use with draw bar coupling, the cars are here shown coupled together through a movable draft member 10 in the form of a draw bar secured to each of the cars by draft gear which is the same for each car. The draft gear on each car comprises a fixed draft frame structure 11, secured to the end structure of the car frame and carrying a yoke member 12 in which is slidably mounted a mounting rod 13. This draft frame structure 11 is a composite structure comprised of a transversely extending vertical floor truss 63 substantially rectilinear in form and a forward vertical truss 64 conforming to the plan form shape of the front end of the car. Throughout their lengths the upper chord members of the trusses 63 and 64 are joined together by the longitudinally extending floor beams or stringers 67. In their mid portions both the upper and the lower chord members of the trusses 63 and 64 are joined by upper and lower strut members 68 parallel to each other and lying not far apart but on opposite sides of the vertical plane of symmetry. The points where struts 68 are joined to the upper and lower chord members of the truss 63 are joined by diagonal struts 69 to the apices 70 of the end truss member 64. The points where the members 68 are joined to the upper and lower chord members in the truss 63, are also joined to the front truss 64 by diagonals 71 which lie in the vertical plane of the struts 68 and are best shown in Figure 3. These diagonals 71 are pyramided toward the end of the car from truss 63 and at the apex of the pyramid are joined to the mid portions of vertical struts 72 in the truss 64. The yoke 12 is secured to the apex of this pyramided structure formed by the struts 71. It is through this strong and deep draft frame that the strains of the coupling are transmitted to the floor frame and side frames of the car. The mounting rod 13 passes through an aperture 14 in the yoke with sufficient clearance to permit a universal oscillatory movement of the rod in the yoke as well as a sliding movement of the rod through the yoke. Mounted near each end of the rod and spaced from opposite sides of the yoke are a pair of discs 15 and 16. Between these discs and the yoke, on either side of the yoke are mounted rubber cushion members or compression rings 17 surrounding the mounting rod 13 and arranged in two groups, one group on each side of the yoke, the members of each group being aligned and kept out of contact with the mounting rod by washers 18 having flanged central openings fitting around the mounting rod with sufficient clearance to permit free sliding relative movement between the washers and the bar, with the flanges extending partly into the central opening of adjacent cushions to act as seats for the cushions. The pairs of washers 18 between adjacent cushions are secured together back-to-back with the flanges extending away from the pair.

The mounting rod 13, constitutes in effect, an end portion of the movable draft member 10, which movable draft member in the present instance is a draw bar in the form of a tube connected with the mounting rod 13 through a filler-collar or bushing 19. The disc 15 abuts against the end of the member 10 and bushing 19 secured to the member and may be further secured in fixed relation to said member in any suitable manner, such as by arc welding, as indicated at 20. The disc 16 abuts against the mounting nut 21 threaded on to the end of the rod 13.

Figure 7:
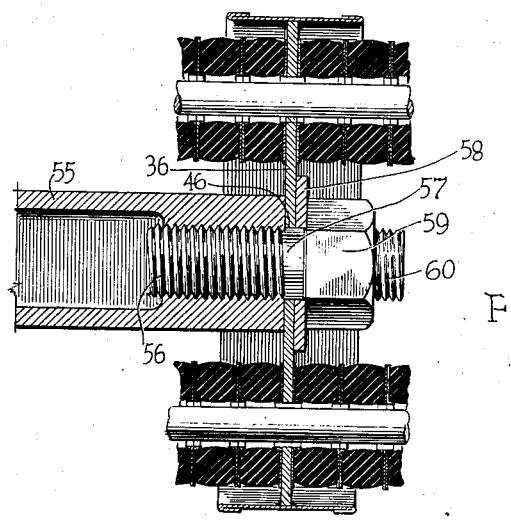
Fig. 7 is a fragmentary vertical axial section showing the connection of an automatic coupler member with a draft gear arrangement slightly modified from that shown in Figs. 5 and 6.
Figure 5:
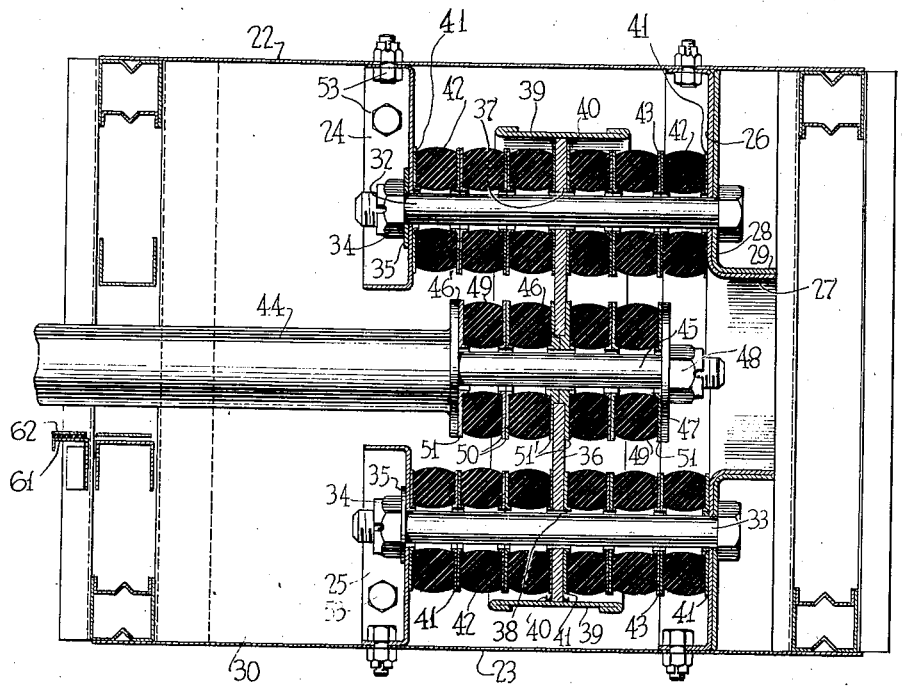
Fig. 5 is a vertical section taken on the line 5—5 of Fig. 6, showing a form of the invention capable of use with either a draw bar coupling or an automatic coupler.
Figure 6:
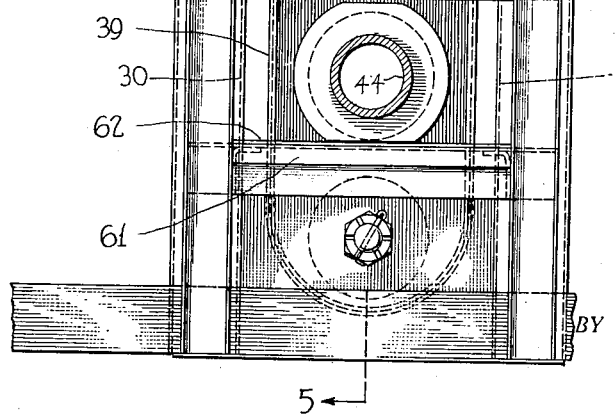
Fig. 6 is a front elevation of the structure shown in Fig. 5 with the draw bar in section.

It will be clear that the parts may be assembled after the rod 13, disc 15 and draft member 10 are permanently secured together, by stacking two of the rubber cushion members 17 on to the rod with an end washer 18' between the stack and the disc 15 and a pair of spacing washers 18 interposed between adjacent cushion members, then threading the rod through the opening in the yoke 12 and washers 18 situated on opposite sides of the yoke, after which the two remaining rubber cushion members or pads 17 are stacked on to that portion of the rod which projects through the yoke with a pair of supporting washers 18 interposed. The washer 16 with the adjacent end washer 18' is then placed on the end of the rod 13, and the whole stack of rubber cushion members or pads 17 brought under partial compression by threading nut 21 on to the threaded end of the rod 13 against the rubber cushions. The rod 13, and consequently the end of the movable draft member 10 are thus resiliently but firmly held in the yoke member 12 with the annular rubber cushion or pad members 17 partially compressed and acting to resiliently restrain both longitudinal and oscillatory movement of the draft member 10, thus acting to absorb shocks transmitted through said member while maintaining the rod 13 and yoke 12 out of contact with each other. For example, when a sudden movement or shock is transmitted through the draft member or draw bar 10 from left to right (Fig. 3) such shock will be taken up by compression of the left hand rubber cushion rings between the disc 15 and yoke 12, while the increase in distance between the disc 16 and the yoke is taken up by expansion of the right hand rubber rings. Oscillatory movement of rod 13, for example, a clockwise oscillatory movement (Fig. 3) will be resiliently restrained by compression of the upper portion of the rubber rings to the left of the yoke and the lower portion of the rings to the right of the yoke while the increase in distance between the lower portion of disc 15 and the yoke, and the upper portion of disc 16 and the yoke will be taken up by expansion of the lower portion of the rings to the left of the yoke, and the upper portion of the rings to the right of the yoke. Similarly, oscillation of the draw bar in a horizontal plane as in turning curves will be resiliently resisted by compression of one side of certain cushion rings, the opposite sides expanding to take up lost motion.

Where it is desired to use either a continuous draft member or draw bar coupling or an automatic coupling the invention is embodied in the form illustrated in Figs. 5, 6, and 7. Here the draft frame is comprised of upper and lower plates 22 and 23 respectively, side plates 30 and 31, and the cross plates 24, 25, and 26. The front cross plates 24 and 25 are flanged at their sides and ends to form pan-shaped cross beams, while the rear cross plate 26 is also flanged on all four sides, but extends from top to bottom and side to side of the frame and is provided with a flanged opening 27 which serves as a hand hole permitting access to the central portion of the coupling. The rear cross plate 26 is further reinforced by a plate 28 with flanged opening 29 fitting over the flanged opening of the plate 26. The plates 26 and 28 may be secured together in any suitable manner as by rivets, spot welding or the like.

Mounted in the cross plates one above the other in a vertical plane, and extending longitudinally of the car are a pair of mounting rods 32 and 33. The mounting rods 32 and 33 are in the form of headed bolts which are passed through apertures in the rear cross plate 26 and front cross plates 24 and 25, and held in position by end nuts 34 bearing against the adjacent cross plates through washers 35. An oblong yoke member 36 extends across the rods and is slidably mounted thereon by means of apertures 37 and 38 at the ends of the yoke which pass over the rods 32 and 33 respectively, sufficient clearance being provided between the rod and the sides of the apertures in the yoke to permit oscillatory movement of the yoke about a vertical axis. The yoke 36 is reinforced by a flange member 39 secured to the yoke by arc welding as indicated at 40. At each end of the yoke, and on each side are secured aligning washers 41 having flanged openings registered with the apertures in the yoke. Mounted between the yoke and the cross plates 24, 25 and 26 and surrounding the mounting rods 32 and 33 are stacks of ring-shaped rubber cushion elements 42 arranged in separate groups.

The cushion elements 42 are held in alignment out of contact with the rods 32 and 33 by flanged washers 41 interposed between adjacent rubber pad members and between the end pad members of a group and the adjacent surface of the yoke, front cross plate or rear cross plate. The washers 41 which lie against the opposite surfaces of the yoke as well as those which lie against the front and rear cross plates are secured to such adjacent members preferably by welding, while the pairs of washers interposed between adjacent cushion elements 42 are similarly secured back-to-back with their flanges extended outwardly. The flanged apertures of the washers 41 fit around the mounting rods with substantial clearance with the flanges extending partly into the central openings in the ring shaped pads. The flanges of the washers 41 thus act as seats for the rubber pad rings aligning them in a vertibrated column between the extreme end washers carried by the end cross plates 24—25 and the rear plate 26.

The draft member, which in the present instance (Figs. 5 and 6) is a draw bar 44, is provided at its end with a mounting rod 45 extending through an aperture 46 at the center of the yoke 36. The draw bar 44 is provided with a flange 46' where it joins the rod 45 while an end flange 47 in the form of a washer is fitted over the end of the rod 45 and held in place by nut 48 threaded on to the end of the rod. Between the yoke 36 and the flanges 46' and 47 is mounted a stack of rubber cushions 49 with interposed flanged spacing washers 50, end washers 51, and middle washers 51', the washers being arranged with the flanges extended into the openings of the cushion members. The interposed washers 50 are arranged in pairs secured back-to-back with flanges extending outwardly of the pair into the openings of adjacent rubber cushion members. Thus the flanges act as seats for the pads to keep them out of contact with the mounting rod 45. All of the spacing washers 50 and 51 have sufficient clearance to assure their remaining out of contact with the mounting rod 45. The middle washers 51' are provided with shoulders fitting snugly into the aperture 46 in the yoke. The parts are assembled with all of the rubber cushions partly compressed, that is under slight compression so as to hold the parts firmly in the position shown and take up slight variations in spacing by expansion.

In assembling the parts, the draft frame is assembled with the front cross plates 24 and 25 unattached and the rear cross plate 27 mounted in position as shown. The mounting bars 32 and 33 are inserted through the rear cross plate 26 until the bolt head engages the plate after which the three rubber cushions 42, with their spacing washers 43 forming the inner or right hand end of the upper and lower stacks, are passed over the mounting rods from the forward end, after which the yoke is slid in over the rods and the rubber cushions 42 and their associated spacing washers which form the forward halves of the stacks slid in place over the rods. The front cross plates are then bolted in place by means of the nut and bolt connections 53, after which the washers 35 are placed over the ends of the rods and the rods secured in place by nuts 34 threaded over the forward ends of the rods. The draw bar 44 may now be connected with the yoke by placing on its mounting rod 45 the first two rubber cushion members 49 together with their associated spacing washers and passing the rod 45 through the central aperture in the yoke member 36 after which the remaining two cushion members 49 together with their associated spacing washers are placed on the end of the rod 45, and the whole stack thus assembled is bound together under partial compression by placing the end washer 47 over the end of the rod 45 and clamping it against the stack of rubber cushions by threading the clamping nut 48 on to the end of the rod against the washer 47. Access to the inner or right hand side of yoke 36 for making this last assemblage is had through the hand hole opening 27 in the rear cross plate 26.

The various parts are so proportioned and arranged, and so adjusted in assembling, as to put the rubber cushions 42 and 49 in all the stacks under substantial initial pressure or partial compression sufficient to tend to normally hold the draw bar 44 firmly but resiliently centered in the position shown when under no load.

In operation the draft member is permitted to move longitudinally in either direction and to oscillate either vertically or horizontally, but resiliently restrained in all such movements by the rubber compression pads. It will be clear from Fig. 5 that upon movement of the draw bar to the right, the force of this movement is transmitted through the left hand half of the center stack and the right hand halves of the top and bottom stacks to the draft frame structure while upon outward or left hand movement of the draw bar the force of such movement will be transmitted through the right hand half of the middle stack and the left hand halves of the upper and lower stacks to the draft frame.

In resisting inward movement of the draw bar, the left hand half of the middle stack, and right hand half of the upper and lower stacks will be compressed, the remaining halves of the stacks expanding to take up the increased spacing. Similarly outward movement of the draw bar will be resisted by compression of the right hand half of the middle stack and left hand half of the upper and lower stacks. Oscillation of the draw bar about a vertical axis, such as would occur in turning curves, or in relative sidewise motion between the cars due to side sway, is resiliently resisted by compression of one side of the rubber cushion members 42 and 49. For example, when the draw bar 44 swings toward the observer, the rings in the middle stack on the left side of the yoke will be compressed on the near side while the right hand rings will be compressed on the far side, resulting in a twisting motion of the yoke in the direction of oscillation of the draw bar which twisting motion is resisted at the upper and lower stacks by compression of the far sides of the cushion rings on the left of the yoke and compression of the near sides of the rings on the right of the yoke.

In vertical oscillation of the draw bar due to relative vertical movement of the coupled cars, the oscillatory movement will be similarly, resiliently resisted by compression of the top and bottom of different sets of the cushion rings in the central stack. However, tilting movement of the yoke member 36 about a transverse axis will be more strongly resisted because such movement would necessitate substantial straight axial compression of one half of each of the upper and lower stacks. As the draw bar, yoke and draft frame are all supported by the interposed rubber cushions there is no contact of the relatively movable metallic parts thereby eliminating noise in operation.

Where it is desired to use automatic coupling members, the arrangement shown in Fig. 7 is used which is the same as that in Figs. 5 and 6 except that the central stack of rubber cushion elements is omitted and the draft member 55, which in this instance (Fig. 7) is the shank of an automatic coupler element, is directly and rigidly secured to the yoke member 36. The coupler shank is secured to the yoke 36 by means of a relatively massive anchor bolt 56 which is threaded into the end of the shank 55 with a smooth portion 57 extending through the central aperture 46 in the yoke and a clamping washer 58 on the far side of the yoke, the whole assemblage being clamped together by a clamp bolt 59 threaded on to the threaded end 60 of the bolt 56.

With this arrangement the bar is permitted to move longitudinally and to oscillate about a vertical axis, both such movements being resiliently resisted by the rubber cushion elements, but is held substantially rigid against oscillation about a horizontal axis due to the fact that the shank 55 is rigidly connected with yoke 36 which cannot oscillate about a horizontal axis without considerable compression of one half of each of the lower and upper stacks of rubber cushions which compressional force must be applied at a point considerably distant from the center of oscillation.

In assembling the parts, the upper and lower stacks are put under sufficient initial compression to normally hold the draft member in a substantially longitudinal position, but to permit the shank to oscillate about a vertical axis with consequent twisting of the yoke member 56 about a vertical axis, resiliently resisted by the rubber cushion members. The draft member is thus normally held in longitudinal alignment when free, and in position for automatic coupling when two cars similarly equipped are brought together.

Where automatic couplers are used, it is not necessary to provide for vertical oscillation of the draft member because relative vertical movement between the couplings is permitted without oscillation of the draft members due to the usual provision for vertical sliding movement between the coupling heads. Because of this freedom of vertical relative movement between the coupling members, and to maintain standard coupling height, the usual rest member 61 and wear plate 62 are provided for the coupler shank to support its weight and the weight of the coupler head not shown. In Fig. 5 the wear plate 62 is shown below and out of engagement with the draw bar because the draw bar is of less diameter than the coupling shank shown in Fig. 7. On the other hand, the coupling shank of Fig. 7 is of such thickness that it will rest upon the wear plate 62.

Having thus shown and described certain embodiments of my invention for the sake of disclosure it is to be understood that the invention is not limited to such specific embodiments, but contemplates all such modifications and variations thereof as fall fairly within the scope of the appended claims.

What I claim is:

1. The combination with a rail car of a draft gear comprising a fixed draft frame, a vertically disposed substantially rigid yoke, rubber cushion means connecting the yoke to the frame for resiliently restrained longitudinal movement and resiliently restrained oscillatory movement about a vertical axis and preventing metal to metal contact between said connected members, and a movable draft member connected to the yoke, said rubber cushion means being disposed in a vertical plane on opposite sides of said draft member.

2. The combination with a rail car of a draft gear comprising a fixed draft frame, a substantially rigid yoke member, a pair of vertically spaced sets of rubber pads connecting the yoke with the fixed draft frame, each set comprising a pad interposed between each side of the yoke and the fixed draft frame under partial compression, and a coupling member substantially rigidly connected to said yoke member at a point between and in a vertical line with said sets of pads, whereby restrained limited universal movement of said coupling member is permitted, draft or buffing loads being applied to all the pads irrespective of the horizontal angularity of the movable draft member.

3. A draft gear for light rail cars comprising a pair of mounting members secured to the car frame and extending longitudinally of the car and positioned one above the other in a vertical plane, a yoke slidably mounted on said members and arranged to oscillate on said members about a vertical axis, rubber compression pads mounted on said mounting members between each side of the yoke and the adjacent ends of the mounting members and confined under partial compression by means adjacent the ends of the mounting members and a coupling member secured to said yoke.

4. A draft gear for light weight rail cars comprising a cross yoke, a draft member rigidly connected to the yoke, and a pair of rubber cushion members connecting the yoke to the car frame at points on opposite sides of the draft member and in the vertical plane of the center of connection of the draft member with the yoke, said cushion members preventing metal to metal contact between said yoke and draft member and the car frame, but permitting limited universal movement of said draft member restrained only by said cushion members, the draw bar pull forces being equally transmitted through both pairs of rubber cushion members regardless of the horizontal angular variation between the draft member and the car frames.

5. The combination with a light weight rail car having an underframe structure, of a draft gear comprising a fixed draft frame member secured to the underframe, a movable draft member having limited universal movement, cushioning means between the respective draft members including a set of rubber cushioning pads, means intermediate said set engaging one of the draft members and means engaging the outsides of said set connected to the other draft member, whereby both compression and tension loads between the draft members are absorbed by the cushioning pads, said cushioning pads being normally fixed with respect to the fixed draft member, the movable draft member and cushioning means and fixed draft member being in vertical alignment whereby draft loads are substantially uniformly placed on all pads irrespective of the horizontal angular variation between the draft members, the elasticity of the pads permitting limited universal movement between said draft members and tending to restore the movable draft member to normal position.

6. The combination with a light weight rail car of a draft gear comprising a fixed draft frame member, a movable draft member, and cushioning means between the movable draft member and the fixed draft member, said cushioning means including at least three sets of rubber pads in vertical alignment, a yoke extending between the three sets of rubber pads substantially intermediate the respective ends thereof and means to secure the top and bottom pads to one of the draft members and the intermediate pads to the other of said draft members whereby limited universal movement between the respective draft members is possible, the vertical alignment of the pads of the sets permitting balanced draft loads to all pads irrespective of the horizontal angular variation between the draft members.

7. The combination with a rail car having a fixed draft frame member and a movable draft member having a limited universal movement with respect to each other, cushioning means between the respective draft members including a set of rubber pads, means to transmit draft and buffing forces between said draft members through said pads, said means including a part disposed intermediate the pads of said set and interconnected with one draft member, and a part engaging the outside portions of the pads interconnected with the other draft member at least part or all of the pads being under draft loads irrespective of the angularity of the draft members, the elasticity of the pads permitting the limited universal movement between the draft members and tending to restore the movable draft member to normal position.

ALBERT G. DEAN.